United States Patent
Eckes et al.

(10) Patent No.: US 7,336,369 B2
(45) Date of Patent: Feb. 26, 2008

(54) MULTI-AXIS INTERFEROMETER SYSTEM USING INDEPENDENT, SINGLE AXIS INTERFEROMETERS

(75) Inventors: William A. Eckes, Castro Valley, CA (US); Jeffrey Sullivan, Castro Valley, CA (US); Kurt Werder, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 88 days.

(21) Appl. No.: 11/241,790

(22) Filed: Sep. 30, 2005

(65) Prior Publication Data

US 2007/0076216 A1 Apr. 5, 2007

(51) Int. Cl.
*G01B 11/02* (2006.01)

(52) U.S. Cl. .................................. 356/500

(58) Field of Classification Search ............... 356/496, 356/498, 500
See application file for complete search history.

(56) References Cited

U.S. PATENT DOCUMENTS 5,801,832 A * 9/1998 Van Den Brink ........... 356/500
6,160,628 A * 12/2000 Inoue ......................... 356/500
6,912,054 B2 * 6/2005 Hill ............................ 356/500

* cited by examiner

*Primary Examiner*—Michael A. Lyons
(74) *Attorney, Agent, or Firm*—Patterson & Sheridan LLP

(57) ABSTRACT

Improved systems, apparatus, and methods for detecting positions of moving stages and a reference position of a beam column are provided. For some embodiments, independent discrete interferometers may be utilized for distance measurements in each axis, rather than a cumbersome monolithic multi-axis interferometer utilized in conventional systems.

20 Claims, 7 Drawing Sheets

MULTI-AXIS INTERFEROMETER SYSTEM USING INDEPENDENT, SINGLE AXIS INTERFEROMETERS

FIELD OF THE INVENTION

The present invention relates to a detection method and a detection device for detecting positions of stages, such as those utilized in particle beam inspection and pattern writing systems.

BACKGROUND OF THE INVENTION

In particle beam (PB) systems, specimens or "workpieces" are retained on movable stages for positioning relative to the beam. Particle beam systems are used in a plurality of industrial fields, including, but not limited to, testing systems, imaging systems like scanning electron microscopes (SEMs), inspection systems for semiconductor devices, and exposure systems for pattern writing via lithography.

There is a high demand for structuring, testing and inspecting specimens within the micrometer and nanometer scale. Micrometer and nanometer scale process control, inspection or structuring is often done with charged particle beams, e.g. electron beams. Charged particle beams offer superior spatial resolution compared to, e.g. photon beams, due to their short wavelengths. However, there are also light-optical, ultra-violet, and x-ray systems with a stage that supports a specimen and the stage being movable to position the specimen with a precision of 50 nm or better.

Generally, as the precision of measurement, testing, or patterning systems increases there is a demand for high precision and fast positioning of specimen in those systems. The stage holding the specimen is typically independently movable in the x-direction and the y-direction. In conventional systems, positioning data of the stage is measured in two perpendicular axes (e.g., X and Y axes).

Interferometers are often used to detect the position of the stage, as shown in FIG. 5, which illustrates a prior art charged particle beam system. As illustrated, conventional interferometer positioning systems often include three laser beams per axis (including measurement beams and a reference beam that interfere to some degree depending on the relative lengths of the paths traveled). Thereby, the three laser beams a, b, c are guided towards the measurement positions along the axis to be measured through a single monolithic optical element 502.

According to this arrangement, two laser beams b, c are directed to a mirror 22 at a stage 20, whereas one laser beam is directed to a mirror 12 at a charged particle column 10 and is used as the reference laser beam for the interferometric measurement. Thus, the two measurement paths directed to and reflected from the stage interfere with the reference beam directed to and reflected from the column. Thereby, two distances of the stage with respect to the column are obtained.

Such position measurement have historically been widely used, at least in part, because the external reference beam path can significantly reduce the amount of data to be evaluated. As shown in FIG. 6, interferometric optical element 60 directs the reference beam a onto column 10. Measurement beam b is directed onto stage 20. Optical element 60 combines the reflected beams to interfere with each other. The monolithic optical element of 502 (shown in FIG. 5) combines the three beams such that the optical-digital converter 510 only needs to convert the superimposed reflected beams. The conversion results may then be provided to beam controller 522 and/or stage controller 524.

While use of the monolithic multi-axis interferometer 502 may reduce the amount of data to be converted, there may also be a number of disadvantages. For example, monolithic multi-axis interferometers typically have to be precisely pre-aligned, since the monolithic optical system does not allow for individual alignment of the laser beams. This pre-alignment is time consuming and expensive. Also, internal adjustments (e.g., of any particular measurement path) are typically not possible, thereby preventing compensation for internal imperfections in the monolithic optical components. Further, multi-axis interferometers utilizing monolithic optics tend to be heavy and prone to vibration which may reduce the accuracy of position measurements.

Accordingly, what is needed is improved systems for detecting positions of moving stages.

SUMMARY OF THE INVENTION

Improved systems, apparatus, and methods for detecting positions of moving stages utilizing independent interferometers for each axis are provided.

Method steps may be performed by way of hardware components, a computer programmed by appropriate software, by any combination of the two or in any other manner. Furthermore, aspects are also directed to methods by which the described apparatus operates. It includes method steps for carrying out every function of the apparatus or manufacturing every part of the apparatus.

Although some of the prior art and systems including the present invention will be described in the following with reference to charged particle beam (e.g., electron and ion beams) inspection and pattern writing systems, it should be understood that the aspects described herein may be made to correct positional errors in a variety of other applications involving a moving specimen.

BRIEF DESCRIPTION OF THE DRAWINGS

Some of the above indicated and other more detailed aspects of the invention will be described in the following description and partially illustrated with reference to the figures. Therein:

FIG. 2b shows another site view of the embodiment of FIG. 2a;

DETAILED DESCRIPTION OF THE DRAWINGS

For some embodiments, rather than utilize a multi-axis interferometer utilizing a cumbersome monolithic optical structure, discrete interferometers may be utilized for each of the multiple axes. As a result, a greater deal of flexibility may be achieved relative to monolithic multi-axis interferometers, as each of the discrete interferometers may be more easily aligned and independently adjusted.

An Exemplary System

Figure 1:
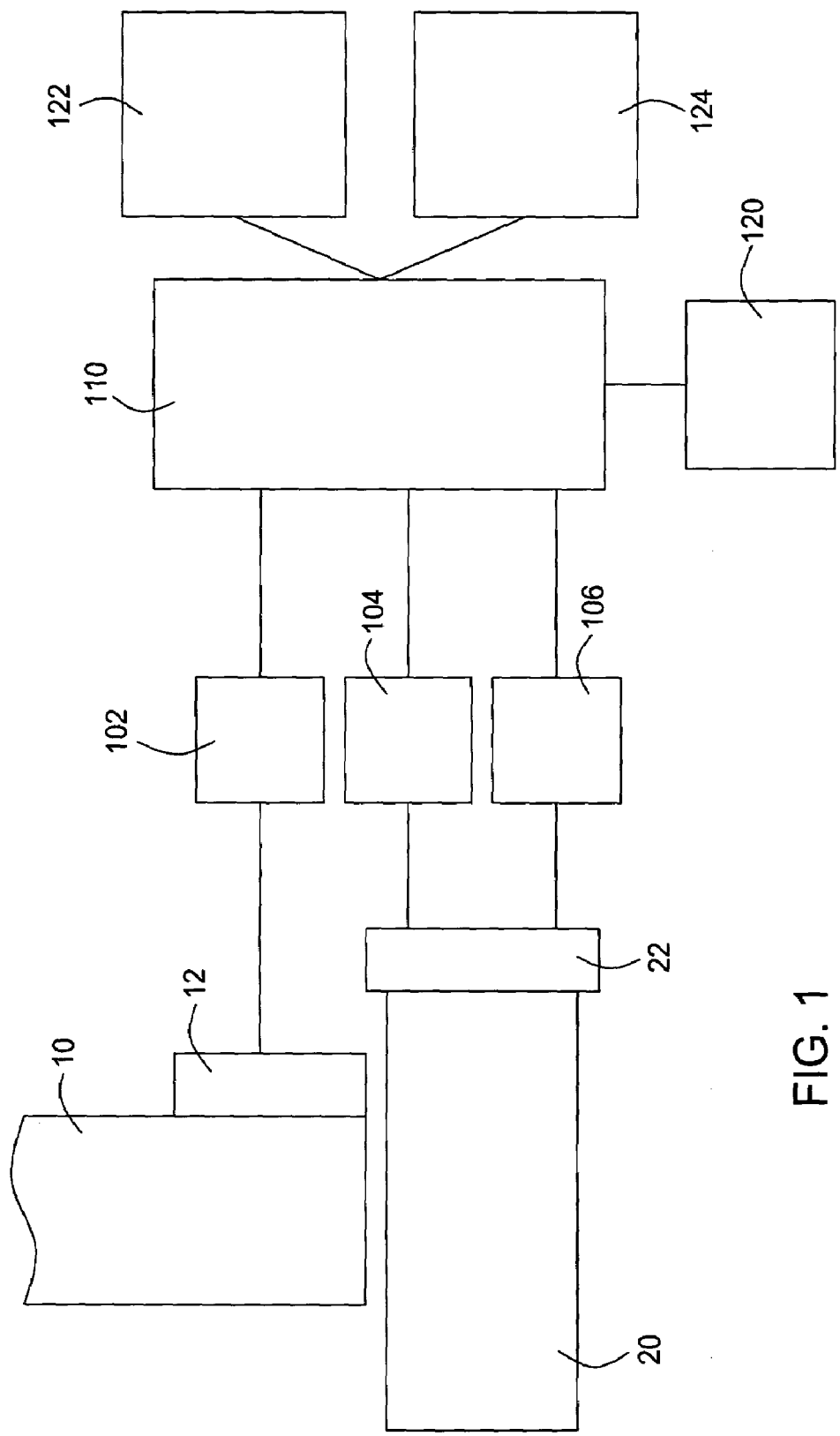
FIG. 1 shows a schematic drawing of a system with a stage and a first embodiment of an interferometer metrology system.

A first embodiment of the present invention will now be described with respect to FIG. 1. FIG. 1 is a system diagram of a charged particle beam system including the optical components of a laser interferometer position monitoring system in accordance with one embodiment of the present invention. FIG. 1 shows the base of a column 10 for directing a charged particle beam (e.g. an electron beam) onto a specimen (not shown) retained on a stage 20.

Generally, the stage 20 is movable in at least two directions (e.g., perpendicular X and Y directions) in order to allow the system to direct the beam on all areas of the specimen. However, the movement of the stage may introduce misalignments whereby the beam hits the specimen at a position that is at least slightly different than the desired (or target) position. Additionally, within high precision systems, wherein writing or measuring require a specimen positioning precision better than 50 nm, thermal effects generating a drift between the beam and specimen must be compensated for. Further, it is possible that either column 10 or stage 20 may be prone to vibrations, which may also result in a positioning errors of the stage with respect to the column Therefore, accurate measurements of the column position, as well as the stage position are desirable in order to allow compensation for such misalignments. Accordingly, a system for accurately measuring the position of the stage relative to the column is desirable. In the illustrated embodiment, three independent (discrete single-axis) interferometers 102, 104, and 106 are provided.

The first interferometer 102 provides a column reference position measurement. The measurement beam path is directed onto mirror 12 attached to column 10. Interferometer 102 also provides an internal reference beam path. Examples of possible embodiments for an independent interferometer will be described in more detail with respect to FIGS. 3a to 3d. As is well known, beams traveling along the measurement beam path and reference beam path may interfere with each other and, thereby, form the interferometric signal.

As is well known, the amount of interference will vary as the measurement path length changes relative to the reference path length. Depending on the particular embodiment, the interferometric signal can be guided from the interferometer to an optical-digital converter with an optical fiber and/or with other optical elements like lenses or mirrors. In any case, the optical-digital converter 110 may be configured to generate a digital value indicative of the measurement path length to the column. Thus, column position may be tracked.

Interferometers 104 and 106 operate in a similar manner to interferometer 102 and each have measurement beam paths directed onto a mirror 22 attached to stage 20. Thus, interferometers 104 and 106 may each provide a interferometric signal to optical-digital converter 110. In turn, the optical-digital converter 110 may generate digital values indicative of measurement path lengths to different positions on the stage 20, thus allowing stage position to be tracked.

In contrast to conventional monolithic multi-axis interferometers, the independent interferometers 102, 104, and 106 provide the ability to extract positional data from each of the three axes independently. Further, the measurement beams directed to the stage and the measurement beam directed to the column are not optically differentiated, but rather differentiation may be performed electronically (e.g., in a processor 120).

The three independent axes may also be arranged independently. For example, the measurement beam paths can be vertically aligned and have a distance between the measurement beam of interferometer 102 and the measurement beam of interferometer 104 of about 30 mm or above. The distance of the measurement beam of interferometer 104 and the measurement beam of interferometer 106 may be about 30 mm or above. The particular arrangement of the axes may vary with different embodiments and depend on the particular measurements desired.

As described above, optical-digital converter 110 generates positional data, that is a distance value, for each of the three axes. A computing system 120 may compare this positional data to desired stage positions in order to generate correction signals (e.g., based on an error vector) for compensating for misalignment, drift or vibrations of the column 10 and/or the stage 20. For example, the correction signals may be provided to beam controller 122 and/or stage controller 124 in order to make adjustments to the stage position relative to the beam taking into account the calculated position error.

Exemplary Interferometer Arrangements

Figure 2A:
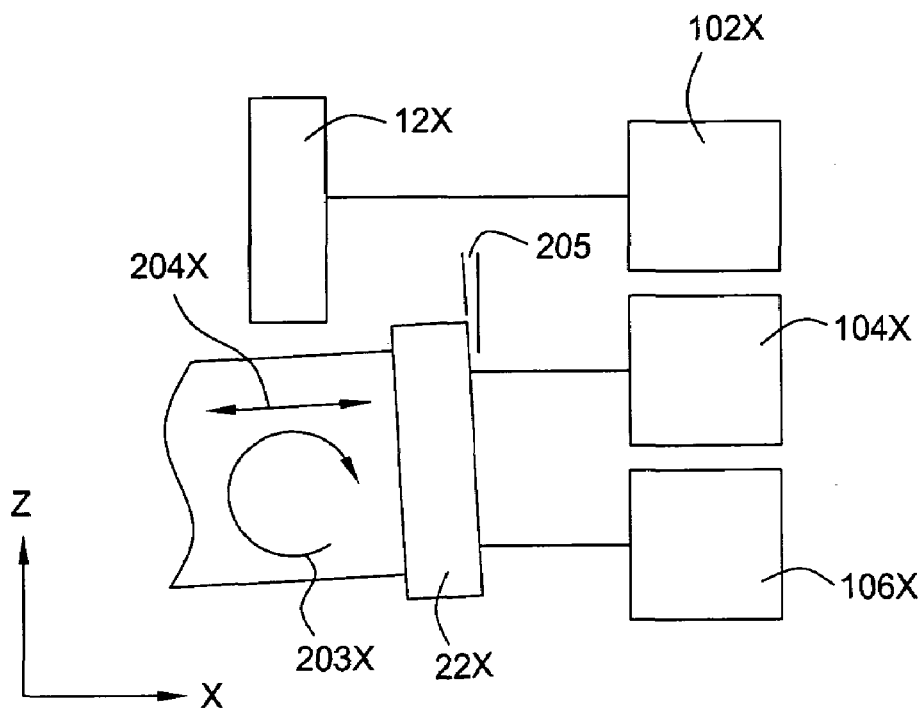
FIG. 2a shows a schematic drawing of three single-axis interferometers in a side view to explain the obtainable measurement results.
Figure 2B:
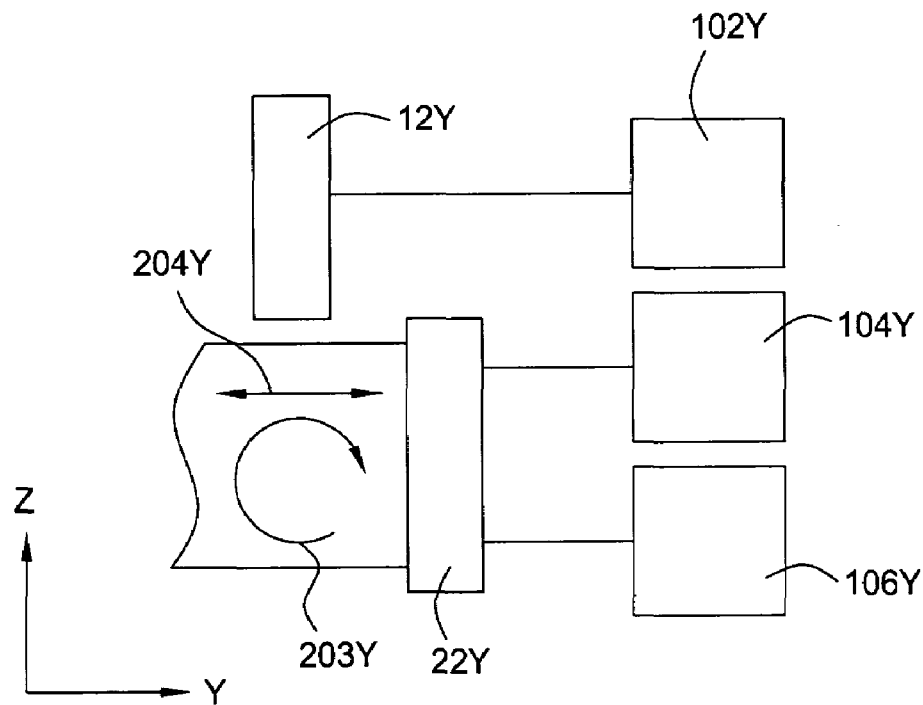

Some of the possible calculations of the computing system 120 will now be described with respect to FIGS. 2a and 2b which illustrate interferometric systems. In other words, the various positions and distances described below may be calculated by the computing system 120. FIG. 2a shows a side view of first multi-axis laser interferometer metrology system along an Z-X plane, while FIG. 2b shows a side view of second multi-axis laser interferometer metrology system along an Z-Y plane.

Referring first to FIG. 2a, a first single-axis interferometer 102x, measures a distance to mirror 12x fixed to column 10 (see FIG. 1), which is indicative of the position of the column in the x-direction. A second single-axis interferometer 104x measures the distance to mirror 22x fixed to the stage, which is indicative of the position of the stage in the x-direction. The difference of these two distances, provides a relative position of the stage with respect to the column.

The relative position of the stage with respect to the column, can be used for example to measure a new position of the stage as indicated by arrow 204x, for comparison against a target position. Thereby, misalignments of the stage moving to a new position can be taken into account. Further, different behaviors of the column and the stage in view of thermal expansion, which may result in a drift of the relative position, can also be measured, for example, by comparing absolute positions of the stage and/or column taken at different times.

Further, vibrations of the column and the stage may be detected independently. Vibrations of the column and the stage may be introduced in the system by acoustic noise or other components, like vacuum pumps or the like. Thereby, generally, different vibration modes occur. Measuring the distance of each axis independently, enables the metrology system to measure the movements of the respective mirrors and, thus, enables binning data by frequency ranges.

Contrary to prior art devices (monolithic multi-axis interferometers), vibration modes of the column and the stage are not combined in one relative distance measurement. As a result, individual vibration modes of the column and/or the stage can be separated and the compensation can take place appropriately for each vibration mode. An example would be applying a factor of 1× for very low frequencies to compensate for baseline thermal expansion. A different factor may be applied for column or lid resonances, which take place at significantly higher frequencies. These frequencies may, for example, be in the range of 100 Hz, 200 Hz or higher. The factors may depend on the pivot point of each vibration mode, respectively. In view of the fact that individual distances are measured, the modal behavior of vibrations of the individual components, which may require different multiplication factors for each mode, can be better detected and, therefore, compensated for more accurately.

As illustrated in FIG. 2a, a third single-axis interferometer 106x is provided. Thereby, a further distance of mirror 22x is measured. Computing system 120 may average the distance values obtained from interferometers 104x and 106x and use the average value in its position or positional error calculations. Further, a rotation of the stage, as indicated by arrow 203x can also be detected based on the different distance values. The rotation shown in the view of the z-x-plane, that is a rotation around a y-directional axis, is generally referred to as pitch. The rotation by angle 205 may influence the distance of the stage with respect to the column and introduce position errors in the x-y-plane that should be compensated.

As mentioned above, FIG. 2b is a side view showing the y-z-plane. To measure movements, misalignments, vibrations, or drifts, in the Y-direction, interferometers 102y, 104y, and 106y may be provided. Components in FIG. 2b (shown with subscript Y) may operate in a similar manner to those in FIG. 2a having the same reference number (shown with a subscript X). The rotation shown in the view of the y-z-plane, that is a rotation around an x-directional axis, is generally referred to as roll.

As shown in FIGS. 2a and 2b, each direction (x and y) is measured with three interferometers, which are vertically aligned. Thus, the system for measuring along the x-direction and along the y-direction includes six interferometers, that is six interferometric optical components, each with a measurement path and a reference path.

Exemplary Interferometer Optics

Next, different exemplary embodiments of interferometric optics will be described with respect to FIGS. 3a to 3d. In other words, the illustrated interferometric optics may be utilized in the interferometers 102, 104, and 106 described above.

Figure 3A:
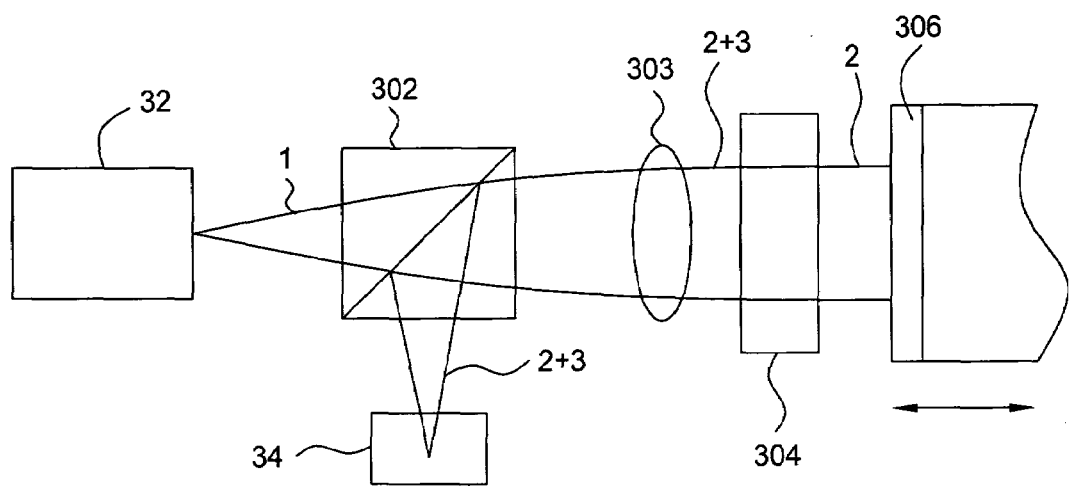
FIGS. 3a to 3d show embodiments of ray paths of interferometers.

Referring first to FIG. 3a, a laser beam source 32 that emits laser beam 1 is shown. The laser beam 1 passes straight through a beam splitter cube 302. Lens 303 collimates the laser beam. Flat reference surface 304 reflects a portion of the incoming beam, providing a reference beam 3. The portion of beam 1 passing through the reference surface 304 forms a measurement beam 2 reflected by mirror 306. Measurement beam 2 and reference beam 3 are directed to detector 34 and interfere upon their return. Detector 34 can for example be a photodiode, a photo multiplier (PM), or any other detector capable of measuring the intensity of the superimposed beams 2 and 3 with the desired time resolution. The interferometer shown in FIG. 3a is commonly referred to as a Fizeau-interferometer.

Generally, for all interferometers described herein, on movement of for example mirror 306 (see arrow) the interference signal of the measurement beam and the reference beam changes because of the coherence of the incoming laser beam 1. The variation of the interfering phases of the measurement beam and reference beam result in a constructive interference or a destructive interference, which changes the intensity of the signal detected at detector 34.

Figure 3B:
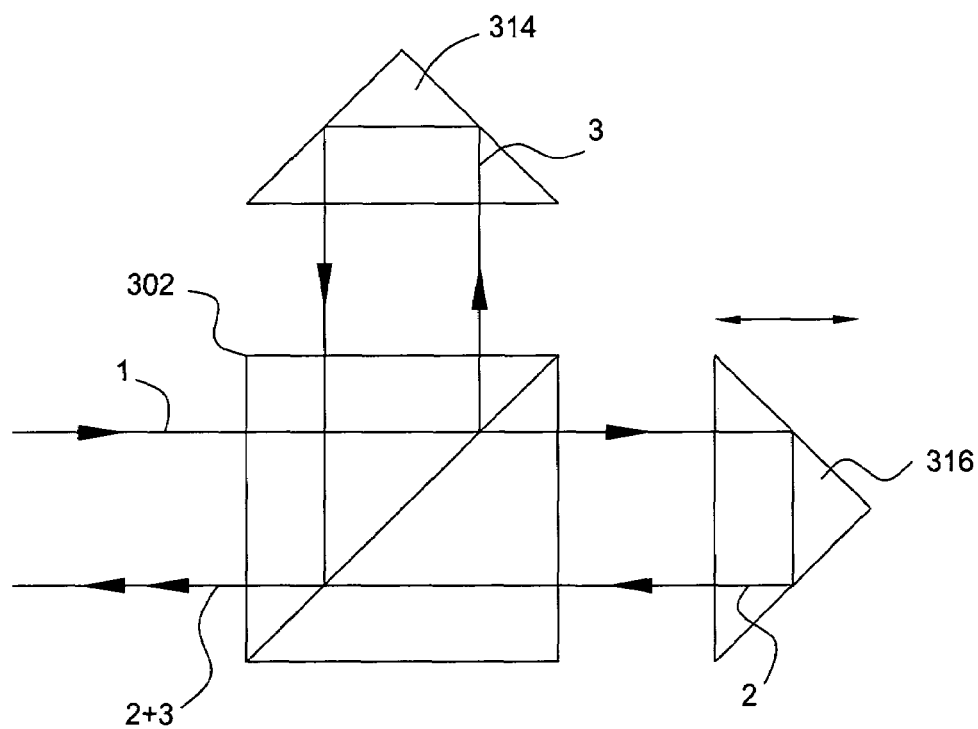

Another embodiment of an interferometric optics is shown in FIG. 3b. Therein, a part of the incoming laser beam 1 is redirected within beam splitter cube 302 to form reference beam 3. Reference beam 3 is reflected by a corner reflector 314. Corner reflector 314 acts as a retroreflector, that is the outgoing reference beam 3 is parallel to the incoming reference beam 3. Measurement beam 2 travels straight in beam splitter cube 302. Similarly to corner reflector 314, corner reflector 316 reflects measurement beam 2 as a retroreflector. In this embodiment, instead of a plane mirror, a retroreflector 316 needs to be provided for the measurement beam for reflecting the measurement beam. The measurement beam 2 and the reference beam 3 superimpose within beam splitting cube 302 and form the interferometric signal (beam 2+beam 3). This signal is again indicative of movements of the corner reflector 316, with movements as indicated by the arrow.

Figure 3C:
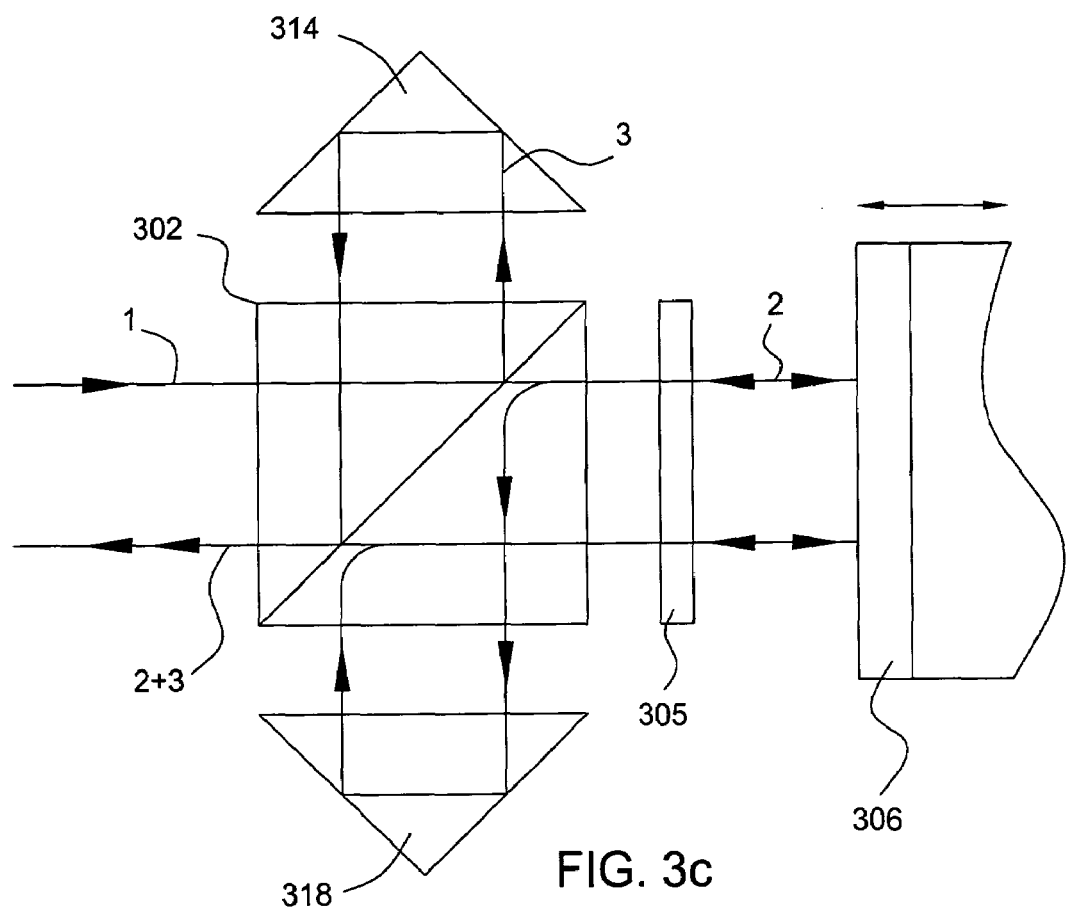

FIG. 3c shows a further embodiment of an interferometric optics. Similarly to FIG. 3b, the reference beam 3 is directed through the beam splitting cube and that corner reflector 314. However, a quarter-wave plate 305 is introduced in the path of the measurement beam 2. Therefore, the measurement beam 2 is redirected in the beam splitter cube 302 towards corner reflector 318, which is a retroreflector. The measurement beam 2 is directed onto the plane mirror 306 the second time. In view of the fact that the measurement beam 2 passes through the quarter-wave plate 305 a second time, the twice reflected beam travels straight through beam splitter cube 302 in order to form the interferometric signal. Therefore, according to the embodiment of FIG. 3c, any advantage that may be provided by using retro reflectors can be combined with a plane mirror reflection for the measurement beam. Further, if mirror 306 moves as indicated by the arrow, the measurement beam path is extended twice the distance of the movement of the mirror. Thereby, resolution of the system may be increased.

Figure 3D:
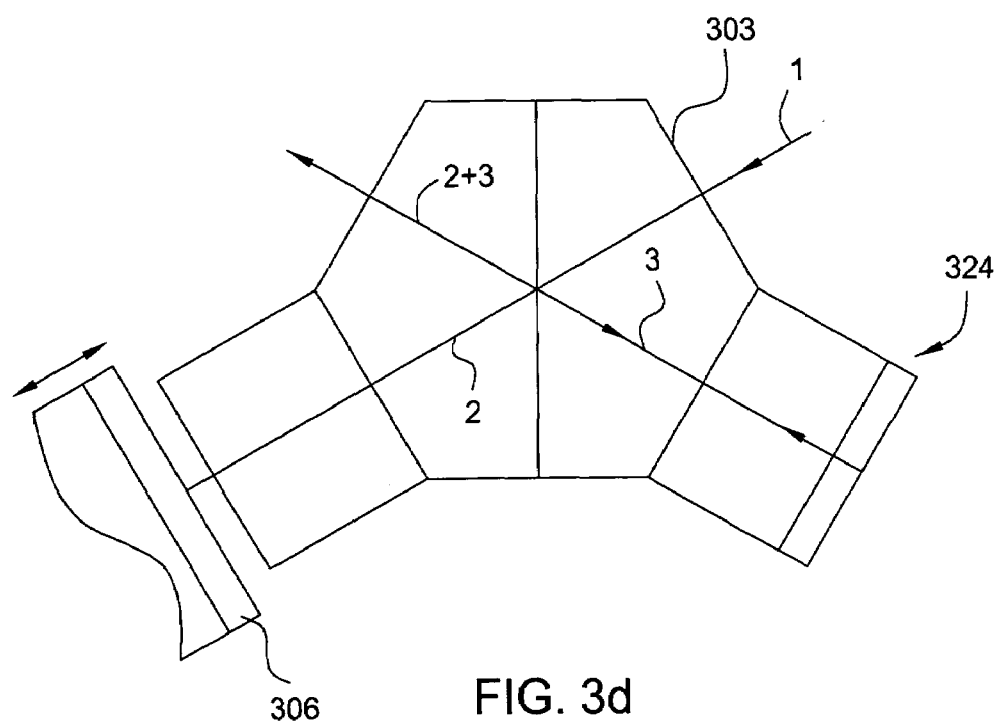

FIG. 3d shows a further embodiment of an interferometric optics. A hexagonal beam splitter 303 is shown. The portion of the incoming laser beam 1 is reflected towards reference mirror 324, thereby forming reference beam 3. The portion of the laser beam traveling straight through beam splitter 303 forms the measurement beam 2 and is reflected at mirror 306. Again, measurement beam 2 and reference beam 3 superimpose to form the interferometric signal 2+3.

Figure 4:
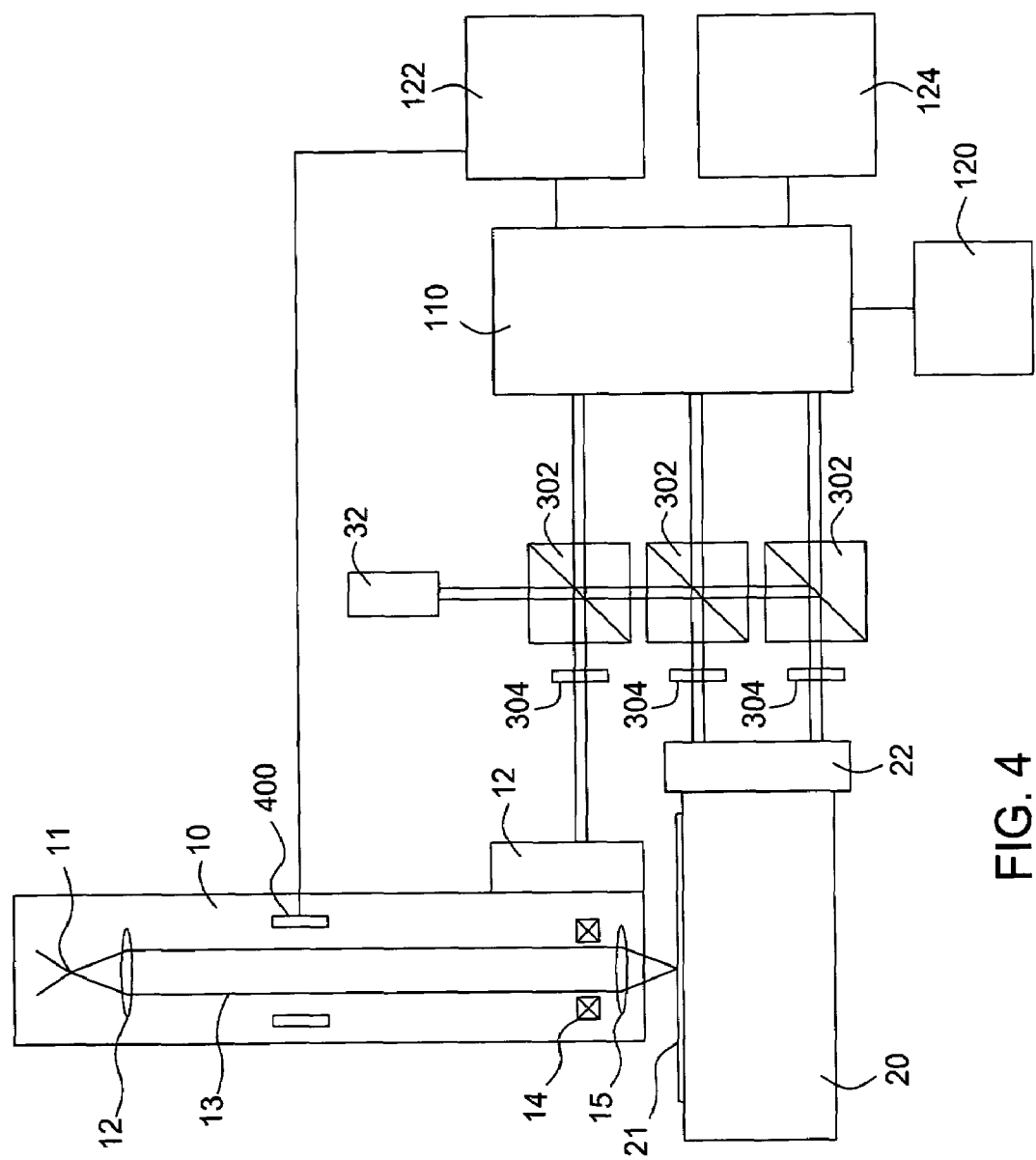
FIG. 4 shows a schematic drawing of a testing device and an embodiment of an interferometer metrology system.
Figure 5:
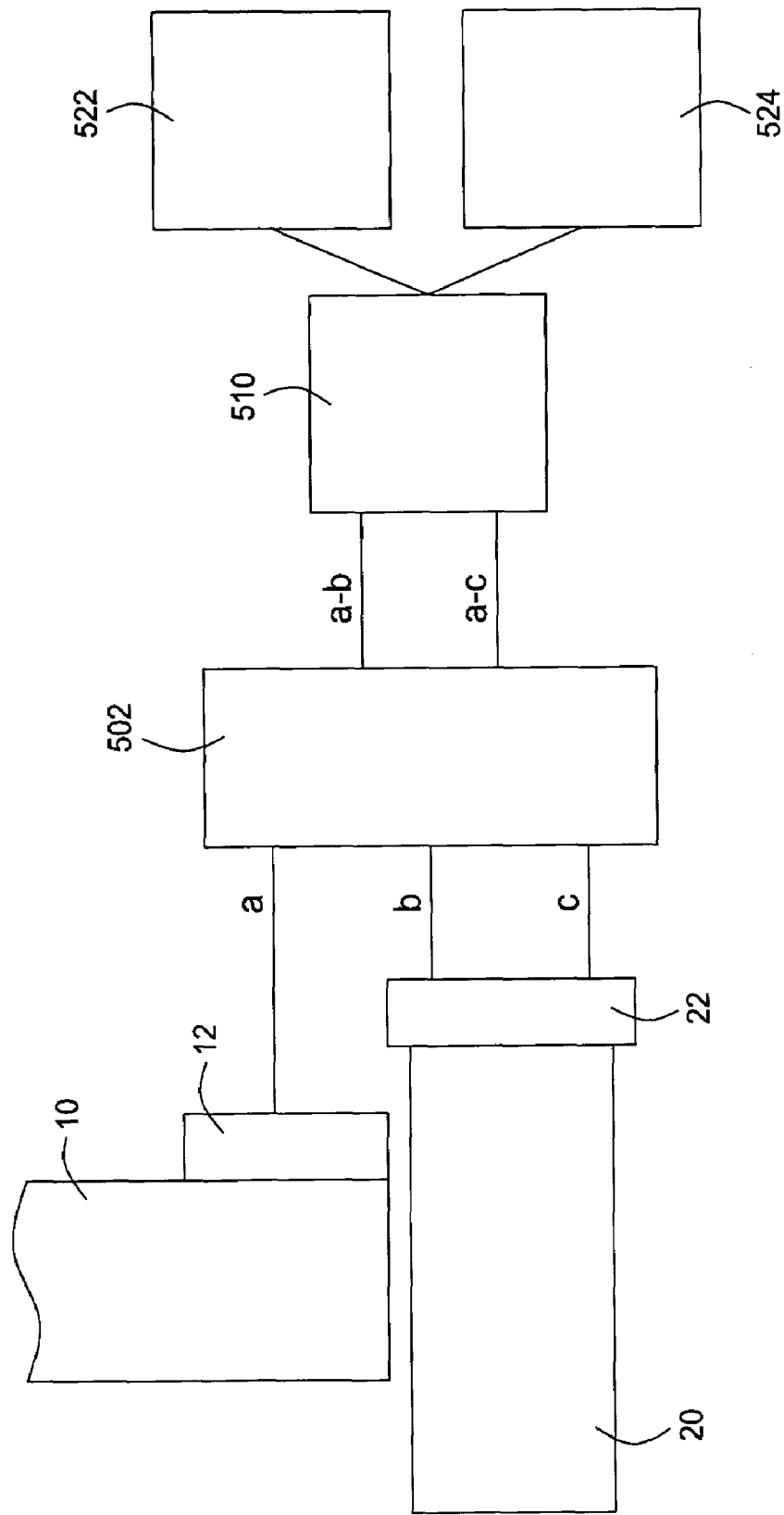
FIG. 5 shows a schematic drawing of a prior art metrology system.
Figure 6:
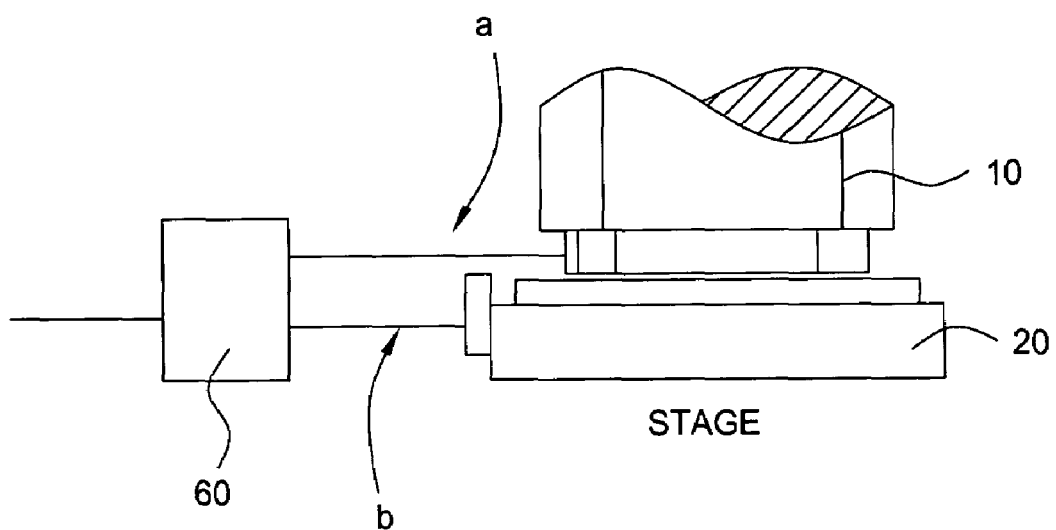
FIG. 6 shows an example for one of the beam paths of the prior art system of FIG. 5.

FIG. 4 shows a charged particle beam system utilizing a multi-axis interferometer system in accordance with one embodiment of the present invention. The charged particle beam system includes a charged particle beam source 11, such as an electron source. The charged particle beam is directed through column 10 by condenser lens 12, deflector system 400, scanning unit 14 and objective lens 15. Other commonly used elements for guiding, forming, imaging or measuring a charged particle beam may also be included. Objective lens 15 focuses the electron beam on specimen 21. Scanning unit 14 deflects the electron beam in a scanning pattern over the specimen. Thereby, secondary and/or backscattered electrons are released on impingement of the primary electron beam sequentially from different measurement locations on the specimen. The secondary and/or backscattered electrons can be detected for testing and/or inspection purposes.

In order to obtain a high resolution, it is desirable to precisely position specimen 21 with respect to the electron beam and, thus, with respect to the electron column 10.

Further, specimen 21 may be moved by moving the supporting stage 20. Thereby, regions of specimen 21, which are located outside the measurement area of the charged particle beam column according to the situation shown in FIG. 4, may also be scanned by the electron beam. Resolution may be improved if misalignments, drifts, and/or vibrations of the stage 20 with respect to the column 10 are taking into account.

In order to measure the position and the orientation of stage 20 (and specimen 21) with respect to the column 10, a laser interferometer system (e.g., as described above) may be provided. FIG. 4 shows a laser beam system with a laser beam source 32. The laser beam is directed to beam splitter cubes 302. Each of the beam splitter cubes directs a part of the incoming laser beam towards the column or the stage, respectively. Accordingly, a laser beam is provided for each of the three axes shown in FIG. 4. Thus, a plurality of laser beams may be generated from the single laser beam source 32. Alternatively, according to another embodiment (not shown), individual laser beam sources may be provided for each of the three axes.

In any case, the laser beams directed towards the column or the stage, are each partly reflected by the plane reference surface 304. Thereby, a reference beam is formed for each axis. The remaining portions of each of the laser beams (the measurement beams) are reflected at corresponding measurement points on mirrors 12 and 22. As described above, mirror 12 attached to column 10 reflects one of the measurement beams, while mirror 22 attached to the stage 20 reflects the other two measurement beams.

The three measurement beams superimpose with the corresponding reference beams and the resultant interferometric signals travel to the optical-digital converter 110. Within this evaluation system 110, detectors are provided for measuring the intensity variations of each of the three independent interferometers. As explained above, the intensity variations result from constructive or destructive interference of each of the three measurement beams with the corresponding one of the reference beams. Consequently, three digitized values are obtained. Each value is indicative of a distance from a mirror 12,22 to the respective interferometer (302, 304).

Computing system 120, which may be connected to evaluation system 110 or may be included in evaluation system 110, may then calculate any of the values described above with respect to FIGS. 2a and 2b.

FIG. 4 shows three independent interferometers. While an interferometer similar to FIG. 3a is shown, those skilled in the art will appreciate that any of the exemplary interferometer arrangements shown in FIGS. 3a-3d may be utilized in the embodiment shown in FIG. 4. In any case, the interferometers are used to measure distances along one direction, for example the x-direction. If it is desirable to provide the same measurements in the y-direction, another three independent interferometers need to be provided. Therefore, a laser interferometer metrology system, capable of measuring along a first direction includes at least two independent interferometric optics, typically three independent interferometric optics. The laser interferometer metrology system, capable of measuring along a first direction and along a second direction includes at least four independent interferometric optics (2 for x-direction, 2 for y-direction), typically six independent interferometric optics. For simplicity reasons, FIG. 4 only shows the interferometric optics for measuring along the first direction.

Within FIG. 4, the evaluation system 110 and the computing system 120 can generate values corresponding to the relative position of the stage 20 with respect to the column, values for the orientation of the stage (pitch and/or roll) and values corresponding to vibrations of the stage and/or the column. One of these values or a combination of these values may be used for compensating for a misplacement of the stage relative to the charged particle beam within column 10. Compensation may be conducted by means of beam controller 122 or stage controller 124.

Beam controller 122 is connected to deflector system 400. Deflector system 400 may include electrostatic, magnetic or combined magnetic-electrostatic deflectors to deflect the charged particle beam. Thereby, deflection in x-direction and/or y-direction may be achieved to compensate for undesirable variation of the position of the charged particle beam with respect to the specimen.

Alternatively, or additionally, compensation may be obtained with stage controller 124, which controls motion of the stage 20 (e.g., via a servo control loop). Thus, undesirable misplacements of the stage relative to the charged particle beam may be compensated for by movement of stage 20, which can be controlled by stage controller 124.

The embodiments described above with respect to FIGS. 1, 2, and 4 typically have identical structures for each of the interferometers included in the metrology system. Thereby, thermal expansion or other influences occur similarly for each independent interferometer. Thus, essentially zero temperature coefficient can be realized.

Further, utilizing independent single-axis interferometers reduces the necessity for complex optical systems. Thereby, costs and weight may be reduced. The weight reduction and the possibility of small dimensions of the optical systems may also reduce sensitivity to vibrations and drift. This is particularly true, since single-axis interferometers have reduced necessity for folding and splitting optics in the critical measurement/reference path. Their mountings are, therefore, not as sensitive to vibration and drift as conventional monolithic multi-axis interferometers.

Further, independent interferometers are independently adjustable. Contrary to prior art system with monolithic multi-axis interferometers which are pre-aligned by the supplier, independent adjustment of each single-axis interferometric optics according to the requirements of a particular application is possible. Thus, the laser interferometer system utilizing independent interferometers for each axis is more flexible and allows for optimization of the measurement beam placement. As one example, it is possible for the above-described embodiments, to utilize large vertical dimensions of a stage mirror to maximize pitch and roll resolution (e.g., with small angles of pitch and roll resulting in relatively large differences in measured distances).

Having thus described the invention in detail, it should be apparent for a person skilled in the art that various modifications can be made in the present invention without departing from the spirit and scope of the following claims.

What is claimed is:

1. A multi-axis interferometer position system for use in a beam system, comprising:
   a first interferometer for providing a first interferometric signal indicative of a distance to a column along a first axis;
   at least second and third independent interferometers for providing second and third interferometric signals indicative of distances to different locations on a movable stage along second and third axes, wherein the first, second, and third axes are substantially parallel; and processing logic configured to calculate a relative distance between at least one of the locations on the movable stage and the column and a parameter related to the relative distance between the different locations on the movable stage based on the first, second, and third interferometric signals.

2. The system of claim 1, wherein each of the second and third independent interferometers has an associated reference beam.

3. The system of claim 1, further comprising a fourth interferometer for providing a fourth interferometric signal indicative of a distance to the column along a fourth axis intersecting the first axis.

4. The system of claim 3, wherein the fourth axis is substantially perpendicular to the first axis.

5. The system of claim 3, further comprising at least fifth and sixth interferometers for providing fifth and sixth interferometric signals indicative of distances to different locations on the movable stage along fifth and sixth axes, wherein the fourth, fifth, and sixth axes are substantially parallel.

6. The system of claim 5, wherein the fourth, fifth, and sixth axes are substantially perpendicular to the first, second, and third axes.

7. The system of claim 1, wherein each of the first, second, and third interferometers are independently adjustable.

8. The system of claim 1, further comprising an optical-to-digital converter for receiving at least one of the first, second, and third interferometric signals and outputting a corresponding digital value indicative of the distance to the column or the different locations on the movable stage.

9. The system of claim 1, further comprising a beam controller coupled to the processing logic for moving a beam in response to the calculated relative distance between at least one of the locations on the movable stage and the column.

10. The system of claim 1, further comprising a stage controller coupled to the processing logic for moving the stage in response to the calculated relative distance between at least one of the locations on the movable stage and the column or the parameter related to the relative distance between the different locations on the movable stage.

11. A method for aligning a movable stage and a beam column, comprising:

detecting a distance from a first interferometer to the beam column along a first axis;

detecting distances from at least second and third independent interferometers to different locations on the movable stage along second and third axes, wherein the first, second, and third axes are substantially parallel;

calculating a relative distance between at least one of the locations on the movable stage and the beam column or a parameter related to the relative distance between the different locations on the movable stage based on the detected distances; and determining whether to move the beam column or the movable stage based on the calculation.

12. The method of claim 11, further comprising moving the beam column or the movable stage an adjustment distance in a direction substantially parallel to the first, second, and third axes based on the calculation.

13. The method of claim 11, wherein determining whether to move the beam column or the movable stage comprises comparing the calculation to a desired position for the beam column or the movable stage.

14. The method of claim 11, wherein each of the second and third independent interferometers has an associated reference beam.

15. The method of claim 11, further comprising detecting a distance from a fourth interferometer to the beam column along a fourth axis intersecting the first axis.

16. The method of claim 15, wherein the fourth axis is substantially perpendicular to the first axis.

17. The method of claim 15, further comprising detecting distances from at least fifth and sixth interferometers to different locations on the movable stage along fifth and sixth axes, wherein the fourth, fifth, and sixth axes are substantially parallel.

18. The method of claim 17, wherein the fourth, fifth, and sixth axes are substantially perpendicular to the first, second, and third axes.

19. The method of claim 17, further comprising moving the beam column or the movable stage an adjustment distance in a direction substantially parallel to the fourth, fifth, and sixth axes based on the calculation.

20. The method of claim 11, further comprising binning the detected distances by frequency ranges.

* * * * *